W. G. KENEDY.
Seed-Planter.
No. 44,955. Patented Nov. 8, 1864.
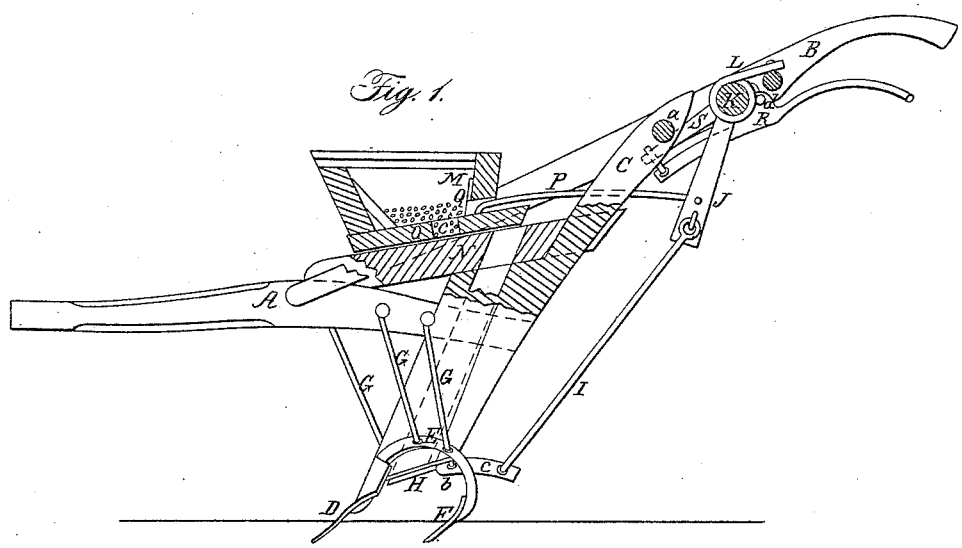
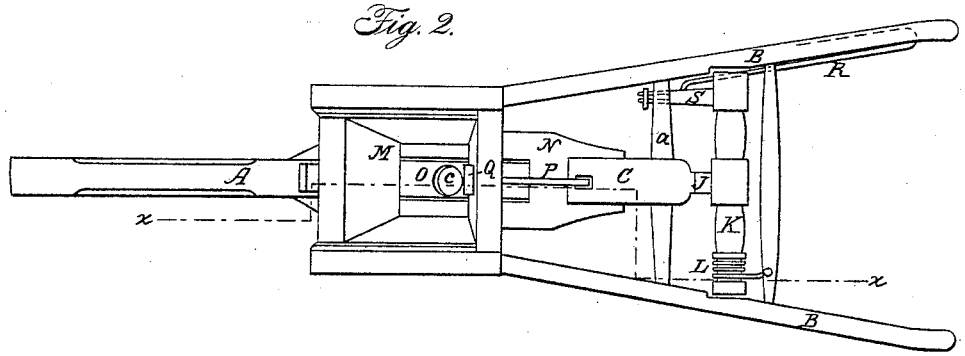
Witnesses:
C. L. Toploff
Henry Morris
Inventor:
W. G. Kennedy
per Munn &Co
attorneys

UNITED STATES PATENT OFFICE.

WILLIAM G. KENEDY, OF GREENFIELD, INDIANA.

IMPROVEMENT IN CORN-PLANTERS.

Specification forming part of Letters Patent No. 44,955, dated November 8, 1864.

*To all whom it may concern:*

Be it known that I, W. G. KENEDY, of Greenfield, in the county of Hancock and State of Indiana, have invented a new and Improved Corn-Planter; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\ x$, Fig. 2; Fig. 2, a plan or top view of the same.

Similar letters of reference indicate corresponding parts.

This invention relates to a new and improved corn-planter of that class in which the seed-dropping mechanism is operated by hand as the machine is drawn along and guided by the driver at its rear.

The object of the invention is to obtain a corn-planter of the kind specified which may be operated with facility, drop the seed with certainty, and not admit of clods of earth being cast upon the hills as the seed is covered.

A represents a beam, to which the draft animal is attached, and B B are two handles, the front ends of which are secured to the beam A and the back parts sustained by a standard, C, through the upper end of which a cross-bar, *a*, of the handles passes. The standard C is attached to the back end of the beam A, and it is tubular in order to serve as a seed-conveying spout. To the lower end of the standard the furrow-share D is attached, which may be of the usual shovel form, and to the upper end of the share D there are attached two curved bars, E E, one being at each side of the standard, and having each a covering-share F attached to its outer end.

G represents a series of rods, the lower ends of which are attached to the curved bars E and the upper ends attached to the beam A, there being five rods, G, in all, two at each side of the standard and one directly in front of it. More rods G, however, may be used, if desired. These rods G serve to prevent clods of earth being thrown on the hills of corn, while they admit of fine or pulverized earth passing between them.

To the lower end of the standard C there is attached a valve, H, which works on a hinge or joint, *b*. This valve has an arm, *c*, projecting from its rear end, to which a rod, I, is attached, the latter extending upward to an arm, J, which is attached to a shaft, K, fitted between the handles B B and having a spring, L, attached to it, said spring having a tendency to keep the valve H closed.

M is a seed-box or hopper, which is placed on a bar, N, attached to the beam A and standard C, and O is a slide which is connected by a rod, P, with the arm J, said slide working on the bar N and within the seed-box M. The slide O is provided with a hole or seed-receptacle, *c*, which, when drawn back, comes in line with the interior of the standard C, through which the seed drops into the furrow made by the share D, the back of the hopper having an elastic plate, Q, attached to it to serve as a cut-off and prevent more seed than the hole *c* will contain from passing out.

R is a lever, which is attached by a fulcrum-pin, *d*, to the right handle B, and is connected at its lower end to arm S of shaft K. The slide O and valve H are operated through the medium of the lever R and the spring L, the outer end of the lever R, when pressed upward by the driver, who has hold of the handles B, causing the slide O to be drawn back and the valve H to open in order that the seed may be discharged, and the spring L throwing said parts back to their original position when the lever R is relieved from the pressure of the hand.

I do not claim broadly a seed-distributing slide and valve arranged so as to be operated by the driver at the rear of the device, for that is not new and may be seen in several patented corn-planters, but arranged differently from my improvement.

I claim therefore as new and desire to secure by Letters Patent—

1. A seed-dropping or seed-distributing device composed of a slide, O, elastic cut-off Q, a valve, H, and a spring, L, all arranged and applied so as to be actuated by the driver at the rear of the machine, substantially as set forth.

2. The guards G, when arranged and applied to the machine in relation with the shares D F F, to operate as and for the purpose specified.

WILLIAM G. KENEDY.

Witnesses:
E. I. JUDKINS,
R. E. BARNETE.